(12) United States Patent
Mainville

(10) Patent No.: US 6,938,538 B1
(45) Date of Patent: Sep. 6, 2005

(54) BORE SEAL TELESCOPIC HOIST

(75) Inventor: Luc Mainville, Joliette (CA)

(73) Assignee: Industries Mailhot Inc., St-Jacques (CA)

( * ) Notice: Subject to any disclaimer, the term of this patent is extended or adjusted under 35 U.S.C. 154(b) by 787 days.

(21) Appl. No.: 09/598,758

(22) Filed: Jun. 22, 2000

(51) Int. Cl.⁷ .................................................. F16J 9/00
(52) U.S. Cl. .............................. 92/251; 92/253; 92/51
(58) Field of Search .......................... 92/51, 52, 53, 92/169.1, 251, 253

(56) References Cited

U.S. PATENT DOCUMENTS 4,003,297 A * 1/1977 Mott .......................... 92/253
5,983,778 A * 11/1999 Dawson ........................ 92/52

* cited by examiner

*Primary Examiner*—Edward K. Look
*Assistant Examiner*—Thomas E. Lazo
(74) *Attorney, Agent, or Firm*—Merchant & Gould P.C.

(57) ABSTRACT

A bore seal telescopic hoist is formed of a series of telescopically arranged tubular sections each having a circumferential reservoir. A circumferential wiper is lodged in the reservoir and is used to collect debris or dirt which may be present on the inner wall of an adjacent tubular section.

4 Claims, 2 Drawing Sheets

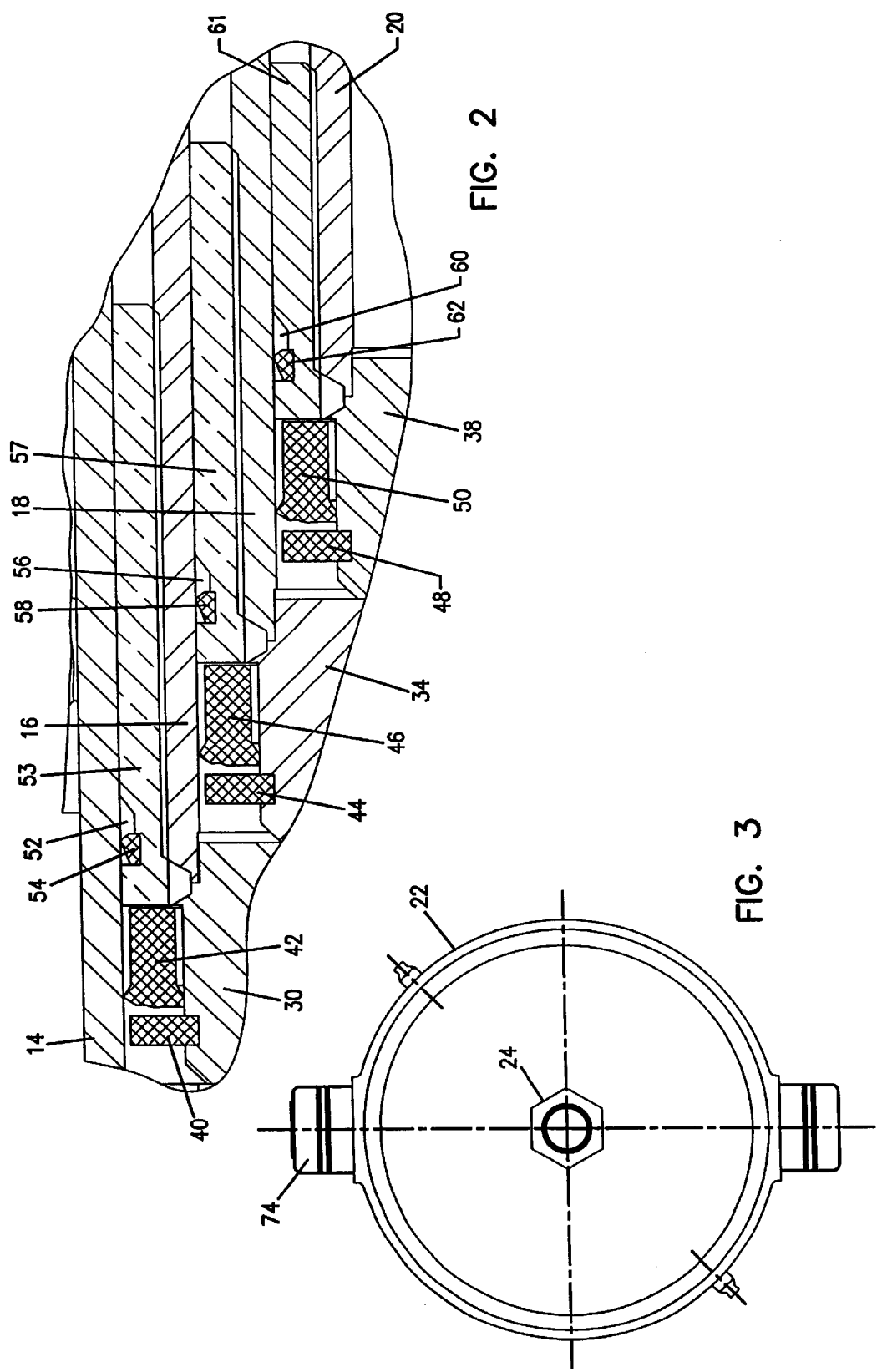

BORE SEAL TELESCOPIC HOIST

FIELD OF THE INVENTION

The present invention pertains to a bore seal telescopic hoist which is formed of a series of telescopically arranged tubular sections.

BACKGROUND OF THE INVENTION

Telescopic hoists of the bore seal type have sections which are in contact with ambient air. There results a collection of debris or dirt on the inside wall of these sections which may affect a proper operation of the hoists.

OBJECT AND STATEMENT OF THE INVENTION

It is an object of the present invention to overcome the problems of debris or dirt on the inner wall of tubular sections of a bore seal telescopic hoist by providing a wiper that collects the debris to lodge them in a reservoir associated with the wiper.

The present invention therefore relates to a bore seal telescopic hoist which comprises a series of telescopically arranged tubular sections, each section having a first end and an opposite second end; each said first end having an inlet port; sealing means at each first end; reservoir means at each said first end located circumferentially adjacent the sealing means; and scraper means in the reservoir means for contacting an adjacent inner wall of a tubular section and depositing in said reservoir means debris scraped and collected thereon.

Other objects and further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

BRIEF DESCRIPTION OF THE DRAWINGS

FIG. 2 is an enlarged section of part A of FIG. 1; and

FIG. 3 is an end view as seen from the right of FIG. 1.

DESCRIPTION OF PREFERRED EMBODIMENTS

Figure 1:
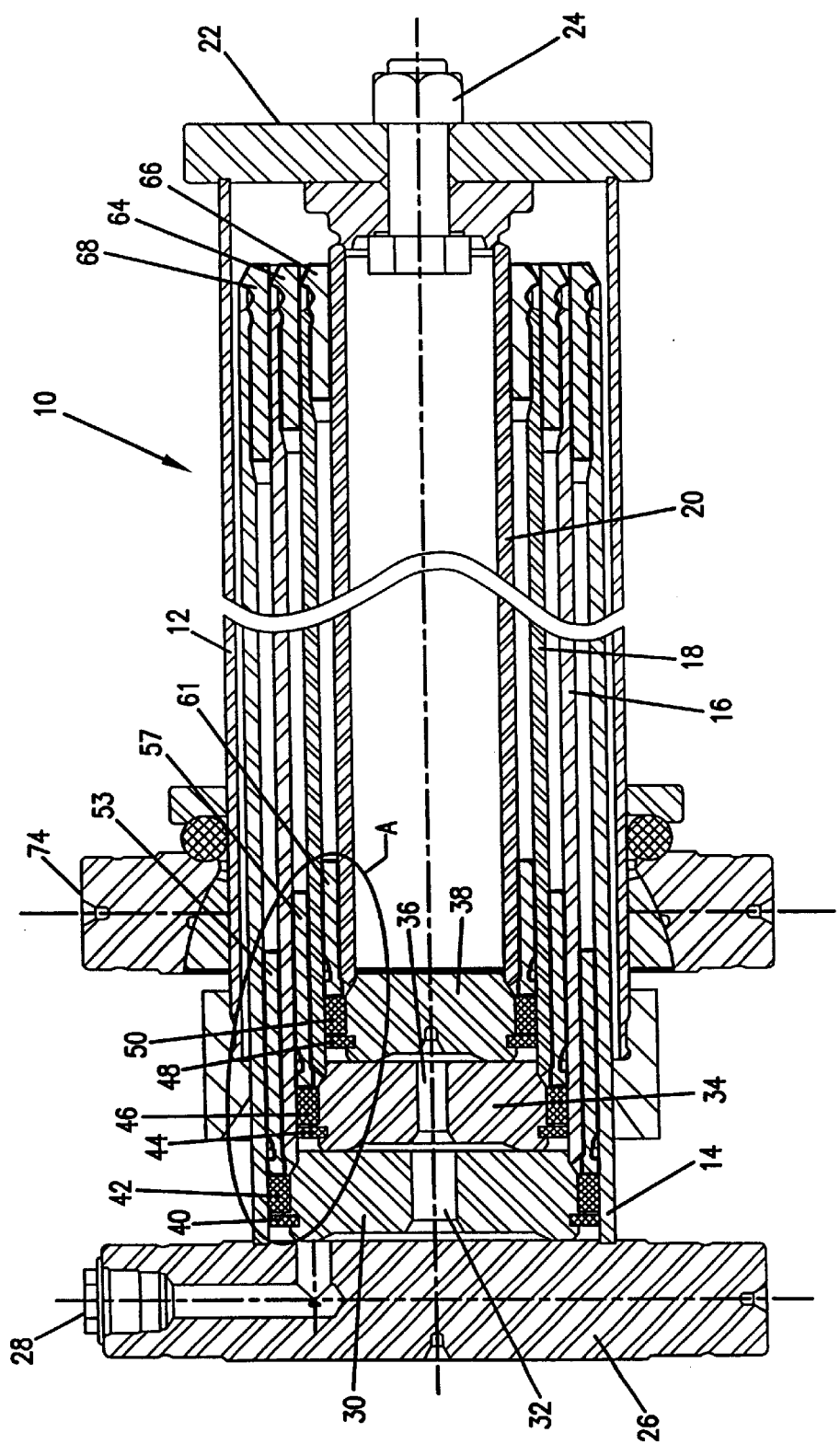
FIG. 1 is a cross-sectional view showing the hoist made in accordance with the present invention.

Referring to the drawings, there is shown a bore seal telescopic hoist, generally denoted 10, which comprises a tubular housing 12 and a series of tubular sections 14, 16, 18 and 20. The tubular housing 12 is closed at one end by means of a plate 22 which is also secured to the innermost tubular section 20 by means of a bolt 23 and a nut 24. The opposite end of the housing is opened to receive the telescopically arranged tubular sections 14, 16, 18 and 20 therein.

The outermost tubular section 14 comprises a head 26 having a hydraulic inlet port 28 allowing fluid to be introduced in an area enclosed between the head 26 and the piston head 30 of the second tubular housing 16. The latter has an opening 32 allowing the fluid to be received in a second area enclosed between the head 30 and a piston head 34 of the third tubular section 18. The latter also includes an opening 36 allowing the fluid to exert pressure on the piston head 38 of the fourth tubular section 20.

Referring more particularly to FIG. 2, the piston head 30 has a circumferential keeper ring 40 and a U-shaped cup bore seal 42; the piston head 34 has a circumferential keeper ring 44 and a U-shaped cup bore seal 46; the piston head 38 has a circumferential keeper ring 48 and a U-shaped cup bore seal 50. The keeper rings are lodged in appropriate circumferential recesses in the piston heads while the U-shaped cup bore seals provide a sealing wall between the areas where the fluid is present and the opposite ambient air side. Adjacent the bore seal 42 is formed a circumferential reservoir 52 in the piston sleeve 53 integral with the tubular wall 16; a circumferential wiper 54 is lodged in reservoir 52. Located adjacent the bore seal 46 is formed a reservoir 56 in the piston sleeve 57 integral with the tubular wall 18; a circumferential wiper 58 is lodged in reservoir 56. Located adjacent the bore seal 50 is formed a reservoir 60 in the piston sleeve 61 integral with the tubular wall 20; a circumferential wiper 62 is lodged in reservoir 60.

In operation when the tubular sections 14, 16 and 18 are telescopically displaced as a result of the introduction of fluid under pressure through the inlet port 28, the wipers 54, 58 and 62 scrape the interior wall of the tubular sections 14, 16 and 18 and any debris or dirt present on these walls is collected in the areas of the reservoirs 52, 56 and 60 respectively unoccupied by the wipers.

Glands 68, 64 and 66 are respectively mounted at the opposite ends of the tubular sections 14, 16 and 18 and serve to contact the piston sleeves 53, 57 and 61, respectively to limit the displacement of their respective tubular section. A trunion 74 is mounted to the exterior wall of the housing 12 for securing the hydraulic jack for operation.

The material of the wiper may be of plastics material, such as urethane, teflon or a composite, rubber or a non ferrous metal, such as bronze.

Although the invention has been described in relation to one specific form, it will be evident to a person skilled in the art that it may be varied or modified in any ways. For example, the wipers could be constructed in a manner that they include a reservoir for collecting the debris or dirt. It is therefore wished to have it understood that the present invention should not be limited in interpretation, except by the terms of the following claims.

What is claimed is:

1. A telescopic hoist comprising:
    a series of telescopically arranged tubular sections, each section having a first end and an opposite end; each said first end having an annular head;
    sealing means mounted on at least one of said annular heads;
    reservoir means on at least one of said first ends located circumferentially adjacent said sealing means; said reservoir means defining a scraper receiving section and a debris receiving area disposed adjacent to said scraper receiving section; and
    scraper means disposed in said scraper receiving section of said reservoir means contacting an adjacent inner wall of an adjacent tubular section whereby debris scraped and collected by said scraper means from said inner wall are deposited in said debris receiving area of said reservoir means.

2. A telescopic hoist comprising:
    a cylindrical housing;
    a series of actuatable tubular sections telescopically received in said housing; each said tubular section having a piston end; an inlet/outlet port in some of said first ends for passage of a pressure fluid therethrough;

seal means mounted in some of said piston ends separating said fluid from ambient air;

bore means provided in some of said tubular sections on a front side of said piston ends; said bore means defining a scraper receiving section and a debris receiving area adjacent said scraper receiving section; and scraper means disposed in said scraper receiving section of said bore means contacting an adjacent inner wall of an adjacent tubular sections whereby debris scraped and collected by said scraper means from said inner wall are deposited in said debris receiving area.

3. A telescopic hoist comprising:

a series of telescopically arranged tubular sections, each section having a first end and an opposite end; each said first end having an annular head;

a seal mounted on at least one of said annular heads;

a reservoir on at least one of said first ends located circumferentially adjacent said seal; said reservoir defining a scraper receiving section and a debris receiving area disposed adjacent to said scraper receiving section; and a scraper disposed in said scraper receiving section of said reservoir contacting an adjacent inner wall of an adjacent tubular section whereby debris scraped and collected by said scraper from said inner wall are deposited in said debris receiving area of said reservoir.

4. A telescopic hoist comprising:

a cylindrical housing;

a series of actuatable tubular sections telescopically received in said housing; each said tubular section having a piston end; an inlet/outlet port in at least one of said first ends for passage of a pressure fluid therethrough;

a seal mounted on at least one of said piston ends separating said fluid from ambient air;

a bore provided in at least one of said tubular sections on a front side of said piston ends; said bore defining a scraper receiving section and a debris receiving area adjacent said scraper receiving section; and a scraper disposed in said scraper receiving section of said bore contacting an adjacent inner wall of an adjacent tubular sections whereby debris scraped and collected by said scraper from said inner wall are deposited in said debris receiving area.

* * * * *